Sept. 1, 1970 T. J. DE BOER 3,526,711
DEVICE COMPRISING A DISPLAY PANEL HAVING A PLURALITY OF CROSSED CONDUCTORS DRIVEN BY AN AMPLITUDE TO PULSE WIDTH CONVERTER
Filed Sept. 29, 1967 4 Sheets-Sheet 1

INVENTOR.
THUS J. DE BOER
BY
Frank R. Trifari
AGENT

INVENTOR.
THIJS J. DE BOER
BY
Frank R. Trifari
AGENT

INVENTOR.
THIJS J. DE BOER
BY
Frank R. Trifari
AGENT

INVENTOR.
BY THIJS J. DE BOER

Frank R. Trifari
AGENT

United States Patent Office 3,526,711

Patented Sept. 1, 1970

3,526,711

DEVICE COMPRISING A DISPLAY PANEL HAVING A PLURALITY OF CROSSED CONDUCTORS DRIVEN BY AN AMPLITUDE TO PULSE WIDTH CONVERTER

Thijs Johannes de Boer, Emmasingel, Eindhoven, Netherlands, assignor, by mesne asisgnments, to U.S. Philips Corporation, New York, N.Y., a corporation of Delaware Filed Sept. 29, 1967, Ser. No. 671,879

Claims priority, application Netherlands, Sept. 30, 1966, 6613813

Int. Cl. H04n 3/10, 5/70

U.S. Cl. 178—7.3 10 Claims

ABSTRACT OF THE DISCLOSURE

A circuit for energizing a display panel of the type having luminescent picture elements at conductor crossings. In order to improve picture contrast, the input signals are converted to constant amplitude pulses having widths corresponding to the instantaneous amplitude of the signal.

Figure 1:
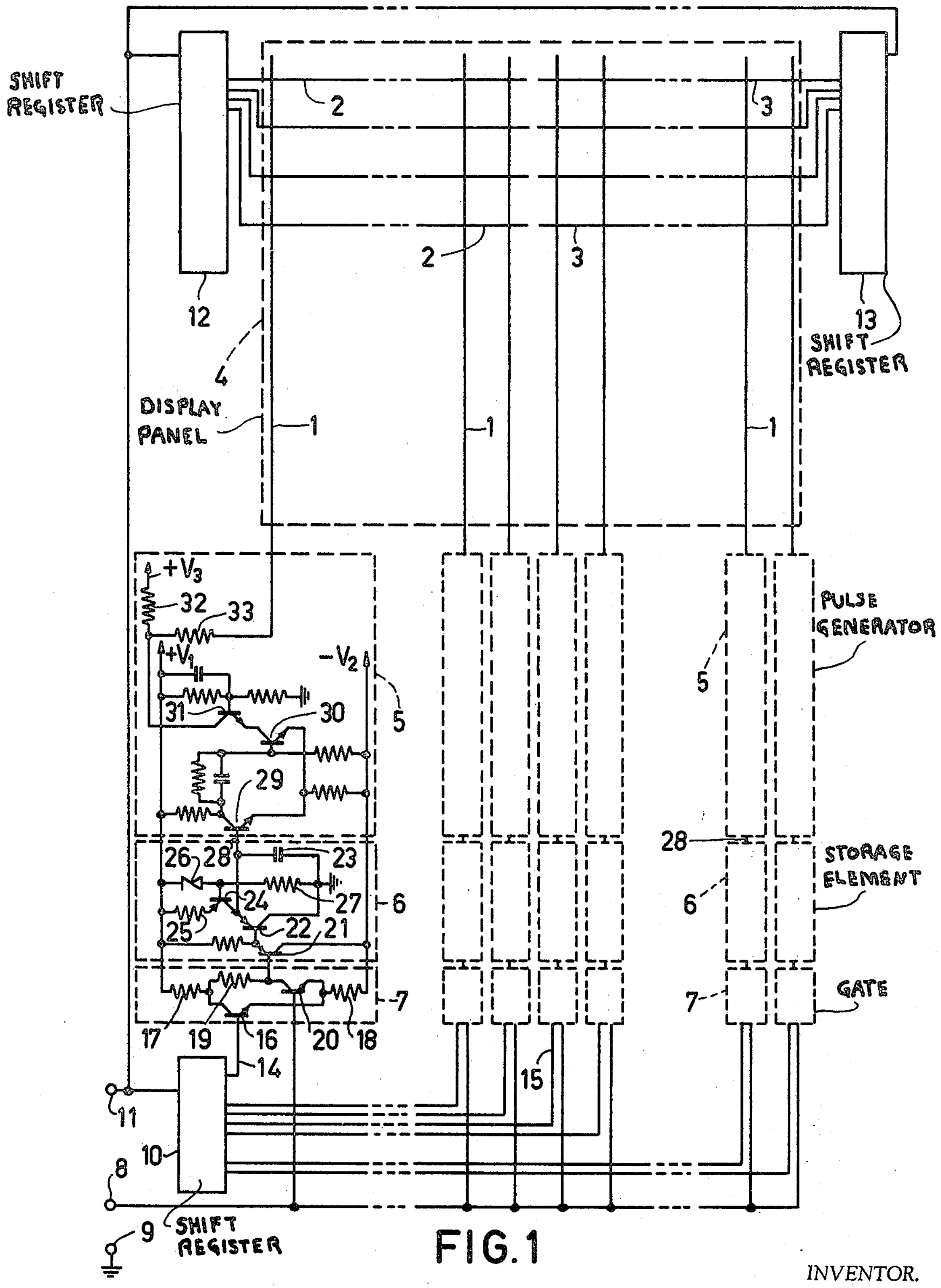

This invention relates to a device comprising a display panel for obtaining a radiation image corresponding to input signals and produced by the luminescene of a registration medium in picture elements and lines between groups of crossing conductors, which device includes means generating sequential control pulses of short duration during each scan period, each control pulse being fed successively to one of the gate circuits associated with the conductors of a first group and also the input signal to be produced, so that each gate circuit passes on an instantaneous value of the said input signal to a succeeding storage element.

Such a device is known, inter alia, from U.S. patent specification No. 3,021,387.

The fields of application for devices comprising display panels are manifold. Radar signals can cause luminescence of the registration medium in the display panel in a simple manner, thus obtaining large, clearly readable radar screens. Television signals, both for monochrome and colour television, can be reproduced in an attractive manner with the aid of a display panel. Such devices are also satisfactorily usable for making signals with the digital information visible.

Known devices comprising display panels have, however, inter alia the drawback that the image produced by the display panel has too few gradations. In fact, the input signal with its instantaneous value frequently causes luminescence of the registration medium directly. Dependent on the magnitude of the instantaneous value, which is supplied as a signal varying in pulse height, the brightness of the luminescent registration medium will be more or less. It is, however known that said brightness does not change proportionally to a change of the instantaneous value. As a result few gradations occur in the image on the display panel, that is to say, the image is not rich in contrast.

An object of the invention is to realize a device comprising a display panel in which the registration medium luminescence showing many gradations proportional to the instantaneous value of the input signal. To this end the device according to the invention is characterized in that a pulse generator is incorporated between storage element and the associated conductor of the first group, which generator gives off pulses of a substantially constant pulse height but with duration which is dependent on the instantaneous value of the input signal to be reproduced.

The invention is based upon recognition of the fact that for obtaining an image having many gradations on the display panel the registration medium must luminesce under the influence of a signal varying in pulse duration instead of pulse height, and this as a function of the instantaneous value of the input signal. This can be realized in a simple manner in a device according to the invention in that a storage element includes at least one capacitor on which a voltage is impressed which is proportional to the instantaneous value of the input signal at the instant when the gate circuit associated with the relevant storage element is released by a control pulse, the resultant change of charge being neutralized immediately or after some time by a current source supplying a substantially constant current, and the capacitor voltage being utilized for operating the pulse generator.

The pulse generator may be designed at a bistable trigger circuit which is either in one or the other stable condition dependent on whether the potential applied to an input terminal of the trigger circuit lies above or below a certain level.

This is, however, the subsequent difficulty that during each scan period both the input signal must be presented to the storage elements and the registered input signal preceding it one scan period earlier must cause luminescence of the display panel. According to a further step of the invention this can be effected by constructing a storage element from two parts each having a capacitor, one terminal of which is connected through a first gate to the said gate circuit associated with a conductor of the first group and connected a second gate to the relevant pulse generator, only one of the two gates conducting during substantially one scan period, whereas the first gate of the one part and the second gate of the other part of the storage element conduct simultaneously. According to another step of the invention the difficulty can also be eliminated by building up the display panel of two parts in which the conductors of the first group are crossed for substantially one half by the conductors of a second group and for substantially the other half by those of a third group, while the device includes means which successively give off pulses having a duration of one scan period to the conductors of the second and the third group, the pulses for the third group being delayed half a scan period relative to those for the corresponding aligned conductors of the second group.

Figure 2:
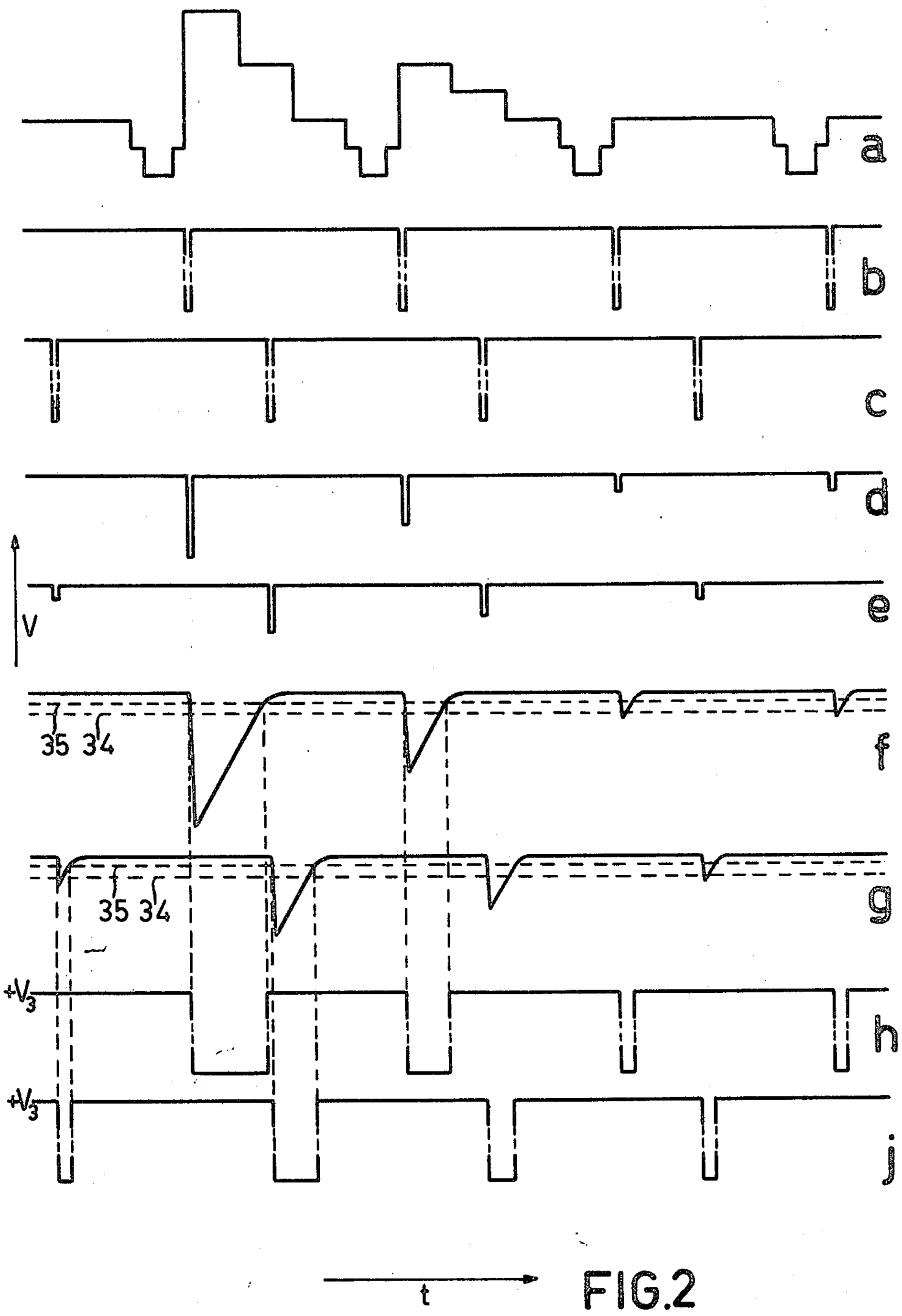
Figure 3:
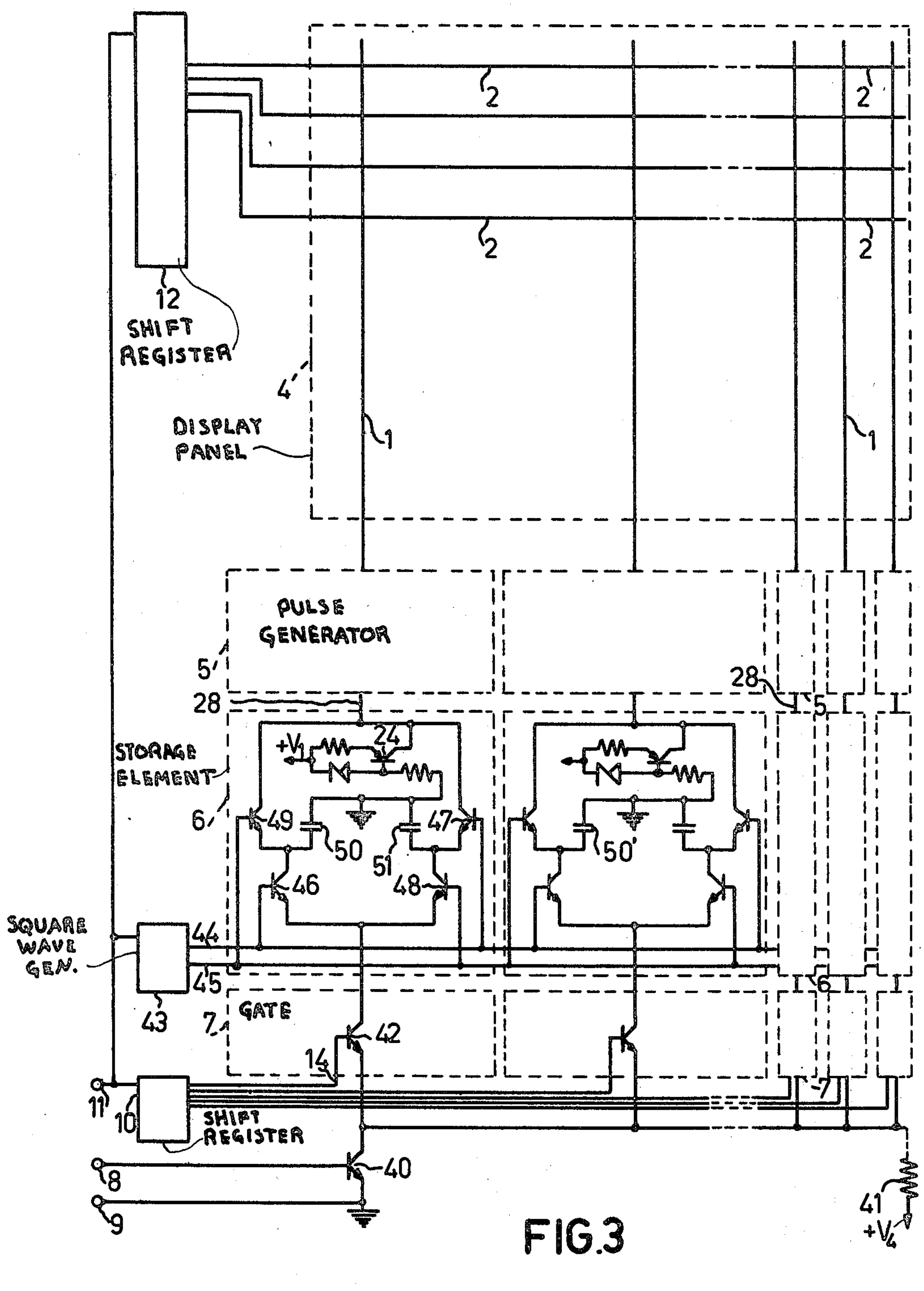
Figure 4:
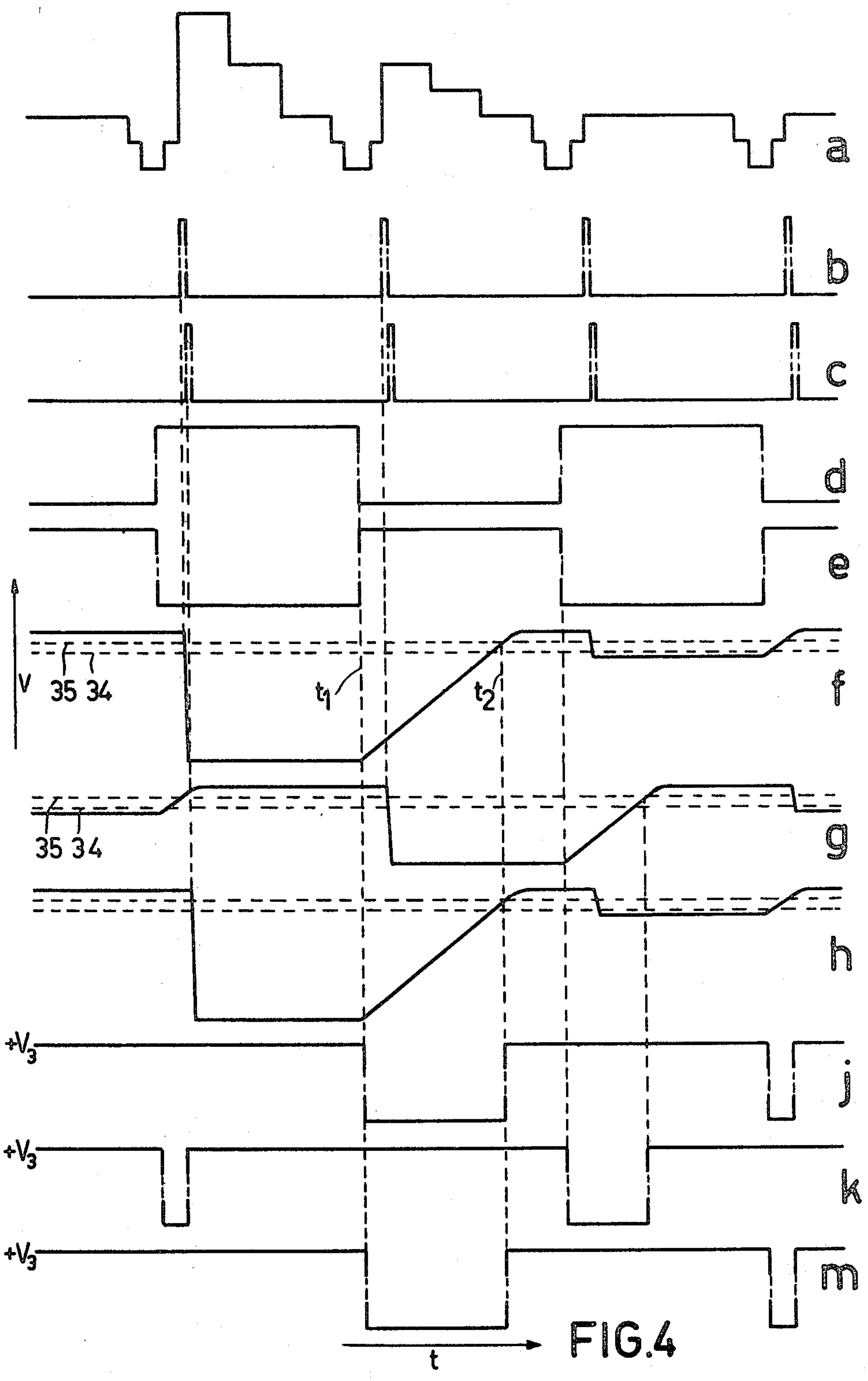

In order that the invention may be readily carried into effect it will now be described in detail, by way of example, with reference to the accompanying diagrammatic drawings, in which:

FIG. 1 shows one embodiment of the device comprising a display panel consisting of two parts, FIG. 2 serves to clarify the device shown in FIG. 1, FIG. 3 shows one embodiment of the device comprising storage elements consisting of two parts and FIG. 4 serves to clarify the device shown in FIG. 3.

In FIG. 1 parallel conductors 1 of a first group of conductors and perpendicularly thereto also mutual parallel conductors 2 and 3 respectively of a second and third group of conductors respectively from a display panel 4. A registration medium which luminesces under influence of voltages applied to the conductors 1, 2 and 3 is provided between the groups of conductors 1 and 2 and 1 and 3 respectively. The registration medium may be an electroluminescent solid substance or a gas, for example, neon which is stored in small tubes in a plastic plate. The tubes are then situated at the crossings of the conductors 1 with the conductors 2 or 3. Conductors 1 are each connected to pulse generators 5, which are designed as Schmitt trigger circuits. Said circuits are controlled from the storage elements 6 each having impressed through one of the gate circuits 7, an instantaneous value of an input signal supplied between the input terminals 8 and 9. The gate circuits 7 are controlled with the aid of sequential control pulses of short duration from a shift register 10, generated during each scan period, said shift register for this purpose being fed with synchronizing signals through a terminal 11. Said synchronizing signals are also applied to shift registers 12 and 13 respectively which successively give off pulses having a duration of substantially one scan period to the conductors 2 and 3 respectively of the second and third group of conductors respectively. The pulses from shift register 13 are delayed half a scan period relative to those from shift register 12 for aligned conductors.

With the aid of FIG. 2, FIG. 1 will further described in detail in which the potential V is plotted along the axis of ordinates and the instant *t* along the axis of abscissae. The scale for the potential V is chosen differently for several parts of FIG. 2. An example of a signal applied to input terminals 8 and 9 and to be reproduced on the display panel is shown in FIG. 2*a*. Three full periods and two parts of periods of this signal are shown. For the sake of clarity synchronizing pulses are shown which are, however, irrelevant for the explanation of the operation of the device according to the invention. In connection with the storage action in the circuit it is assumed that the part of the first period which is not shown corresponds to the part of the fifth period which is shown. The control pulses applied to the associated gate circuits 7 by shift register 10 through leads 14 and 15 are shown in FIG. 2*b* and FIG. 2*c* respectively. After the synchronizing pulse and at the start of the information-containing part of the input signal to be reproduced a pulse occurs as is shown in FIG. 2*b*. As a result the gate circuit 7 connected to lead 14 opens for passing on the instantaneous value of the input signal (see FIG. 2*d*) to the associated storage element 6. The control pulse of FIG. 2*c*, which occurs substantially in the middle of the scan period, performs as shown in FIG. 2*e*, what has previously been described for the conductor 1 which is substantially in the middle of the display panel 4 and is crossed by the conductors 3 of the third group.

The gate circuit 7 operates as follows: without a control pulse, transistor 16, the collector of which is connected through a resistor 17 to a positive potential $+V_1$ and the emitter of which is connected through resistor 18 to a terminal carrying a negative potential $-V_2$, is in bottoming due to the positive DC voltage which the shift register 10 applies to its base through a lead 14. A series combination of a resistor 19 and a transistor 20 is connected in parallel to transistor 16, the emitters being connected together. During the bottoming of transistor 16 the emitter of transistor 20 is at so high a potential that transistor 20 remains cut off for the input signal presented in a limited way to input terminals 8, 9. If shift register 10 gives off a negative going pulse of short duration (FIG. 2*b*) through lead 14 to the base of transistor 16 then transistor 16 will be cut off during this short period. As a result the input signal applied to the input terminals 8, 9 can bring transistor 20 in bottoming during the duration of the pulse. The potential (FIG. 2*d*) occurring at the collector of transistor 20 is then a measure of the instantaneous value of the input signal.

The collector of transistor 20 is connected to the base of a transistor 21 connected as an emitter follower, the emitter of which transistor passes on the instantaneous value of the input signal to the base of a transistor 22. The collector of transistor 22 is connected to earth, while its emitter is connected both to a capacitor 23 serving as a store and to the collector of a transistor 24. Transistor 24 is incorporated in a current-source circuit and for that purpose its emitter is connected through a resistor 25 and its base through a Zener diode 26 to the terminal carrying a positive potential $+V_1$, while the base is connected to earth through resistor 27. Capacitor 23, one terminal of which is connected to earth will receive a substantially constant current supply from the transistor 24 which acts as a current source. The transistor 22 placed parallel to capacitor 23 will, however, serve as a voltage source controlled by the instantaneous value of the input signal. As a result the voltage across capacitor 23, during the pulse duration of the control pulse for the gate circuit will assume a value which is proportional to the instantaneous value of the input signal as is shown in FIG. 2*f* by the trailing edges. In fact, if it is assumed that capacitor 23 has been charged through transistor 24 to a potential value above level 35 then the degree of discharge through the transistor 22, that is to say, the height of the trailing edge in FIG. 2*f* below level 35 will depend on the amplitude of the signal of FIG. 2*d*. Subsequently transistor 24 will recharge capacitor 23 with a constant current which is shown by the leading edges in FIG. 2*f*. In FIG. 2*f* it is assumed that transistor 24 charges capacitor 23 to a certain voltage and is then cut off. For the principle of the invention it is, however, irrelevant to what voltage the capacitor is ultimately charged, provided that this voltage is above the reverse level 35 of the pulse generator 5. It should also be noted that due to the dualism of the charging and the discharging of the capacitor 23 both operations are possible in reversed order.

A lead 28 goes from capacitor 23 to the pulse generator 5 which is designed as a Schmitt trigger circuit. This known circuit includes two transistors 29 and 30 while a transistor 31 forms a cascade circuit with transistor 30 for receiving voltage pulses. In fact, the collector of transistor 31 is connected through a resistor 32 to a terminal carrying a high positive potential $+V_3$ and through a resistor 33 to a conductor 1 of the first group of conductors.

The adjustment and the operation of the pulse generator 5 are as follows: if capacitor 23 carries a voltage above a certain level then transistor 29 will be in bottoming so that transistors 30 and 31 are cut off. The conductor 1 of the first group connected through resistors 33 and 32 to the terminal carrying the positive potential $+V_3$ will therefore carry said potential $+V_3$. If the voltage across capacitor 23 decreases below the previously mentioned level then transistor 29 is cut off and as a result transistors 30 and 31 start conducting. Consequently, the potential at the junction of the resistors 32 and 33 decreases to a value which is determined by the voltage division over resistor 32 and the resistance which exists through transistors 31 and 30 to the terminal carrying a potential $-V_2$. Said low potential will also be impressed on the relevant conductor 1 of the first group of conductors.

By comparison of the FIGS. 2*f* and 2*h* the method of converting an instantaneous value of the input signal into a pulse having a pulse duration proportional thereto can readily be appreciated.

If the voltage across capacitor 23 decreases below the level 34 (FIG. 3*f*) under influence of the voltage source including transistor 22 controlled by the instantaneous value of the input signal the Schmitt trigger circuit is reversed and gives off a negative-going pulse (FIG. 2*h*). The capacitor is subsequently charged by the current source including transistor 24 and the trigger circuit is then reversed again at the level 35. The hysteresis in the Schmitt trigger circuit has been taken into account although this is unimportant for the principle of the invention.

A similar description as given above holds good for all pulse generators 5, storage elements 6 and gate circuits 7 associated with the conductors 1 of the first group of conductors. The duration of each pulse such as given off by register 10 is substantially equal to that of an image dot. Further these pulses are given off to sequential gate circuits 7 at conductors 1 of the first group are spaced apart one image dot. During the first half of a scan period each image dot of the signal of FIG. 2*a* is thus scanned and transmitted through the gate circuits 7 to the storage element 6 so that the conductors 1, which are crossed by the conductors 2, successively receive signals as shown in FIG. 2*h*. For the second half of the scan period this same scanning is effected for sequential image dots for the second half of the display panel. The principle of the operation of the device is shown again in the FIGS. 2*c*, 2*e*, 2*g* and 2*j*, more particularly for the conductor 1, which is substantially in the middle of the display panel 4 and is crossed by the conductors 3 of the third group.

According to a further step of the invention the shift registers 12 and 13 give off pulses having a duration of one scan period, but the pulses for the conductors 3 are delayed half a scan period, relative to those for the conductors 2. The following serves to explain this: at the instant when substantially half a scan period of the input signal has elapsed the conductors 1 situated approximately in the middle of the display panel 4, which conductors are for one part crossed by the conductors 2 and for the other part by the conductors 3, will receive a pulse. The registration medium will luminesce at the crossing under influence of a voltage applied to either of the conductors 2 and 3. The duration of luminescence must be such that the relevant part of the display panel is extinguished before a succeeding scan period of the input signal begins. The result is that the maximum duration of the pulse proportional to the instantaneous value of the input signal can only be half a scan period. In the manner described it has been achieved that a simple design of the storage elements 6 is possible by splitting the display panel into two parts.

In FIG. 3 another embodiment of a device according to the invention is shown more or less diagrammatically. Components, which have been provided with numerals in FIG. 1, are indicated by the same numerals in FIG. 3. Display panel 4 is now built up of only two groups of conductors 1 and 2, whereas the storage elements 6 consists of two parts. The operation of the device according to the invention will be explained further, with the aid of FIG. 4.

The input signal (FIG. 4*a*) applied to input terminals 8, 9 is given off between base and emitter of a transistor 40. The emitter of transistor 40 is connected to earth while its collector is connected to the gate circuits 7 and to a terminal carrying a positive potential $+V_4$ and connected through a resistor 41.

For a more detailed description several components will be considered further. A gate circuit 7 consists of a transistor 42 the emitter of which is connected to the collector of transistor 40. The control pulses given off by the shift register 10 are applied to the base of transistor 42. The pulse shown in FIG. 4*b* is, for example, passed on through lead 14 while the succeeding gate circuit 7 is supplied with the pulse shown in FIG. 4*c*. The collector of transistor 42 is connected to a storage element 6 so that an instantaneous value of the input signal is passed on to the storage element 6 under influence of the control pulses. The storage elements 6 are each connected to a square-wave voltage generator 43 which is controlled by the synchronizing signals applied to terminal 11. Lead 44 carries a square-wave voltage of half a line frequency as is shown in FIG. 4*d*, while the voltage on lead 45 is shown in FIG. 4*e*. The bases of two transistors 46 and 47 are connected to lead 44 while the bases of transistors 48 and 49 are connected to lead 45. The interconnected emitters of transistors 46 and 48 are connected to the collector of the transistor 42. The collectors of transistors 46 and 48 respectively are connected to the emitters of transistors 49 and 47 respectively and are connected to earth through capacitors 50 and 51 respectively. The through-connected collectors of the transistors 49 and 47 are connected to the pulse generator 5 through lead 28 while they are also connected to the current-source circuit including transistor 24 which has previously been described with reference to FIG. 1. In the second storage element 6 which is shown in detail only the capacitor 50′ carries a numeral.

The storage elements 6 function as follows: if transistor 42 passes a pulse the height of which is proportional to an instantaneous value of the input signal then this pulse is given off to the emitters of the transistors 46 and 48. In the positive and negative periods of the voltage on leads 44 and 45 respectively (FIGS. 4*d* and 4*e* respectively) transistors 46 and 47 respectively will start conducting and transistors 49 and 48 respectively will be cut off. Capacitor 50 which, as will be explained hereinafter, was charged in the preceding scan period through the then conducting transistor 49 from the current source formed by transistor 24 will thus be discharged through switching transistor 46 and transistors 42 and 40 to a potential which is determined by the instantaneous value of the input signal at the instant when transistor 42 is released as is shown in FIG. 4*f* by the trailing edge. After the short control pulse for transistor 42 capacitor 50 retains its charge. At the instant $t_1$ the mentioned square-wave voltages change in polarity so that transistor 46 is cut off and capacitor 50 is connected to lead 28 by the transistor 49. As a result the Schmitt trigger circuit in the pulse generator 5 is immediately reversed which, as has already been described in FIG. 1, is caused by the fact that the potential shown in FIG. 4*f* is below the level indicated by the line 34 at the instant $t_1$. Consequently, pulse as shown in FIG. 4*j* is impressed on the associated conductor 1 of the first group. At the same time the current source including transistor 24 will start to charge capacitor 50 through the now conducting transistor 49, which is shown by the leading edge between the instants $t_1$–$t_2$ so that above the potential level 35 the trigger circuit is reversed at the instant $t_2$.

A similar mechanism is effected one image dot later under influence of a control pulse (FIG. 4*c*) for capacitor 50′. The voltage then impressed on capacitor 50′ is shown in FIG. 4*h* while the associated pulse for the relevant conductor 1 is shown in FIG. 4*m*. It is found that the registration of the input signal in the storage elements 6 has been shifted in time while the capacitors 50, 50′, etc. are simultaneously connected to the conductors 1 (instant $t_1$).

Under control of the signals shown in FIGS. 4*d* and 4*e* capacitor 51 is discharged through transistor 48 in the same manner as capacitor 50 and charged through transistor 47 but shifted one scan period. This is illustrated in FIGS. 4*g* and 4*k* for respectively the voltage at capacitor 51 and the pulse derived therefrom for the relevant conductor 1.

It is achieved that during the pulses having a duration of one scan period, which are successively fed to another conductor 2 of the second group, the registration medium between the crossing conductors 1 and 2 luminesces as a function of the magnitude of the instantaneous value of the input signal. By converting variations of pulse-height into variations of pulse-duration the radiation image resulting on the display panel shows many gradations.

It will be evident that also in the case of the device shown in FIG. 3 the discharging and charging of capacitors 50 and 51 respectively can be reversed. Thus it is in principle possible, for example, to charge capacitor 50 from transistor 46 and to discharge it through transistor 49. To this end said transistors must be connected slightly differently but the operation of the whole does not change thereby. The same applies, of course, to capacitor 51 and the transistors 47 and 48 connected thereto.

It will also be evident that for obtaining a satisfactory definition of the radiation image on the display panel 4 the number of gate circuits 7, storage elements 6 and pulse generators 5 must be large. By integrating the circuits the device according to the invention can be realised in a simple manner. Also for colour television an economically satisfactory solution can be obtained by means of integrated circuits with a device according to the invention for each primary colour. In that case the conductors 1 with their associated control circuits 5, 6 and 7 must be triplicated. The first of these three control circuits will then receive the red, the second green and the third the blue colour signal in the same manner as has been described for the black and white signals such as are applied to the terminals 8 and 9.

In case the display panel 4 is a plastic plate including tubes filled with mercury vapour which generates ultraviolet radiation upon luminescence the relevant colour can be realized as follows. Each tube responsible for the red colour is then covered with phosphorus which, when being excited by the ignited gas, emits red light. In the same manner the tubes responsible for the green and blue colours will be covered with phosphoruses emitting green and blue light respectively. An image dot of the panel 4 is in that case formed by red, green and blue dots which are situated side by side in the direction of the conductors 2 and 3 respectively, which dots are each controlled by one of the three conductors 1 triplicated for each image dot.

Since in principle the amplitudes of the output pulses shown in FIGS. 2*h* and 2*j* and 4*j*, 4*k* and 4*m* respectively must be chosen to be as large as possible it will be evident that by means of the pulse generator 5 controlled by an instantaneous value of the input signal also a power amplification is realized so that the display panel 4 luminesces in a distinct manner. The dissipation of all the output transistors 30 and 31 in the trigger circuits 5 is then extremely low since these transistors are either in bottoming (high current, low voltage) or cut off (current zero, high voltage). Since as already mentioned integrated circuits only can be used, the latter fact is extremely important. The many printed circuits which are necessary to control the display panel 4 would cause too much heat if this so-called chopper principle would not be used. In addition the dimensions of a transistor increase as its own dissipation increases. Since preferably the total number of control circuits 5, 6 and 7 in a direction parallel to the longitudinal direction of the conductors 2 and 3 respectively must take up the same space as the display panel 4 because the conductors 1 need not then be placed outside the panel 4 in curves it will be evident that the dimensions of the integrated circuits must be as small as possible. The smaller the natural dissipation the more this can be complied with so that the manner of control according to the invention provides a solution for all these problems.

It will also be evident that although the bistable trigger circuit is designed hereinbefore as a Schmitt trigger circuit other pulse generators can also be used for this purpose. For example, a so-called controlled silicon rectifier (controlled four-layer diode or thyristor) can be used in the embodiment of FIG. 3. The trailing edge of the voltages as shown in the FIGS. 4*f*, 4*g*, and 4*h* is then used to render the controlled rectifier conductive. As the capacitors 50 and 51 respectively are more discharged it will take longer for the rectifier to become conducting after the beginning of a scan period. Thus in the case of the voltage shown in FIG. 4*f* it will take longer from the beginning of a scan period before the voltage exceeds the level indicated by the line 34 than in the case of FIG. 4*g*. When further with the negative-going pulses occurring during the flyback period at the anodes of the four-layer rectifiers it is ensured that these are blocked again at the end of a scan period then it will be evident that the pulse caused by the signal of FIG. 4*f* has a shorter pulse duration than the pulse caused by the signal of FIG. 4*g*. It is true that this is exactly contrary to the duration as is required for a positive-going video signal as shown in FIG. 4*a*. The remedy for this is, however, to convert the signal of FIG. 4*a* so that white in fact corresponds to black and conversely.

What is claimed is:

1. In a display system of the type having a display panel with a medium of a material which luminesces in response to the application of a voltage thereacross, said medium being disposed between the crossings of first and second groups of parallel conductors, separate storage means for applying signals to the conductors of said first group, a source of input signals, and gate means for sequentially applying said input signals to said storage means; the improvement comprising separate pulse generating means connected to apply the signal stored in each storage means to the corresponding first conductor, said pulse generating means comprising means for converting signals stored in said storage means to pulses having constant amplitudes and durations that are a function of the instantaneous value of the input signal stored in said storage means.

2. A circuit for energizing a display panel of the type having a material which luminesces in response to the application of a voltage thereacross, said medium being disposed between first and second groups of parallel conductors, said circuit comprising a source of input signals, gate means for each conduct of said first group, means applying said input signals to said gate means, means for sequentially opening said gate means, storage means for each gate means connected to store the instaneous amplitude of the input signal when the corresponding gate means is open, separate pulse generating means connected to each storage means for producing pulses having widths dependent upon the amplitude of signals stored in the corresponding storage means and constant amplitudes, and means applying said pulses to the corresponding conductors of said first group.

3. A circuit for energizing a display panel of the type having a material which luminesces in response to the application of a voltage thereacross, said medium being disposed between first and second groups of parallel conductors, said circuit comprising a source of input signals, and separate control means for sequentially applying said input signals to the conductors of said first group, each control means comprising first and second storage capacitors, a pulse generator, first gate means connected to said source, second and third gate means connected between the output of said first gate and said first and second capacitors respectively, fourth and fifth gate means connected between said first and second capacitors respectively and the input of said pulse generator, means applying the output of said pulse generator to the corresponding conductor of said first group, and means for alternately opening said second and third gate means and fifth and fourth gate means whereby the instantaneous value of said input signals is stored in one of said first and second capacitors when the other of said first and second capacitors is connected to said pulse generator, said pulse generator comprising means for converting the voltage across said capacitors to pulse having widths dependent upon the voltage stored across said capacitors and constant amplitudes.

4. A circuit as claimed in claim 2 wherein said storage means comprises a capacitor and further comprising means for neutralizing charge on said capacitor including a current source.

5. A circuit as claimed in claim 2 wherein said pulse generating means comprises a bistable circuit.

6. A circuit as claimed in claim 5 wherein said bistable circuit comprises a Schmitt trigger.

7. A circuit as claimed in claim 2 wherein said second group of parallel conductors comprises two subgroups, each extending across substantially one half of said panel.

8. A circuit as claimed in claim 7 further comprising two shift registers each coupled to one of said subgroups and to a source of synchronization pulses.

9. A circuit as claimed in claim 3 wherein said alternate opening means comprises a square wave generator.

10. A circuit as claimed in claim 3 wherein said pulse generator comprises a Schmitt trigger.

References Cited

UNITED STATES PATENTS 3,263,028 7/1966 Shanafelt ---------- 178—7.3

RICHARD MURRAY, Primary Examiner

J. C. MARTIN, Assistant Examiner

U.S. Cl. X.R.

313—108; 315—169; 340—166